Nov. 7, 1961  S. R. BARNES  3,007,348
COMBINATION TAILGATE WINDOW CRANK AND LOCK
Filed Aug. 4, 1960
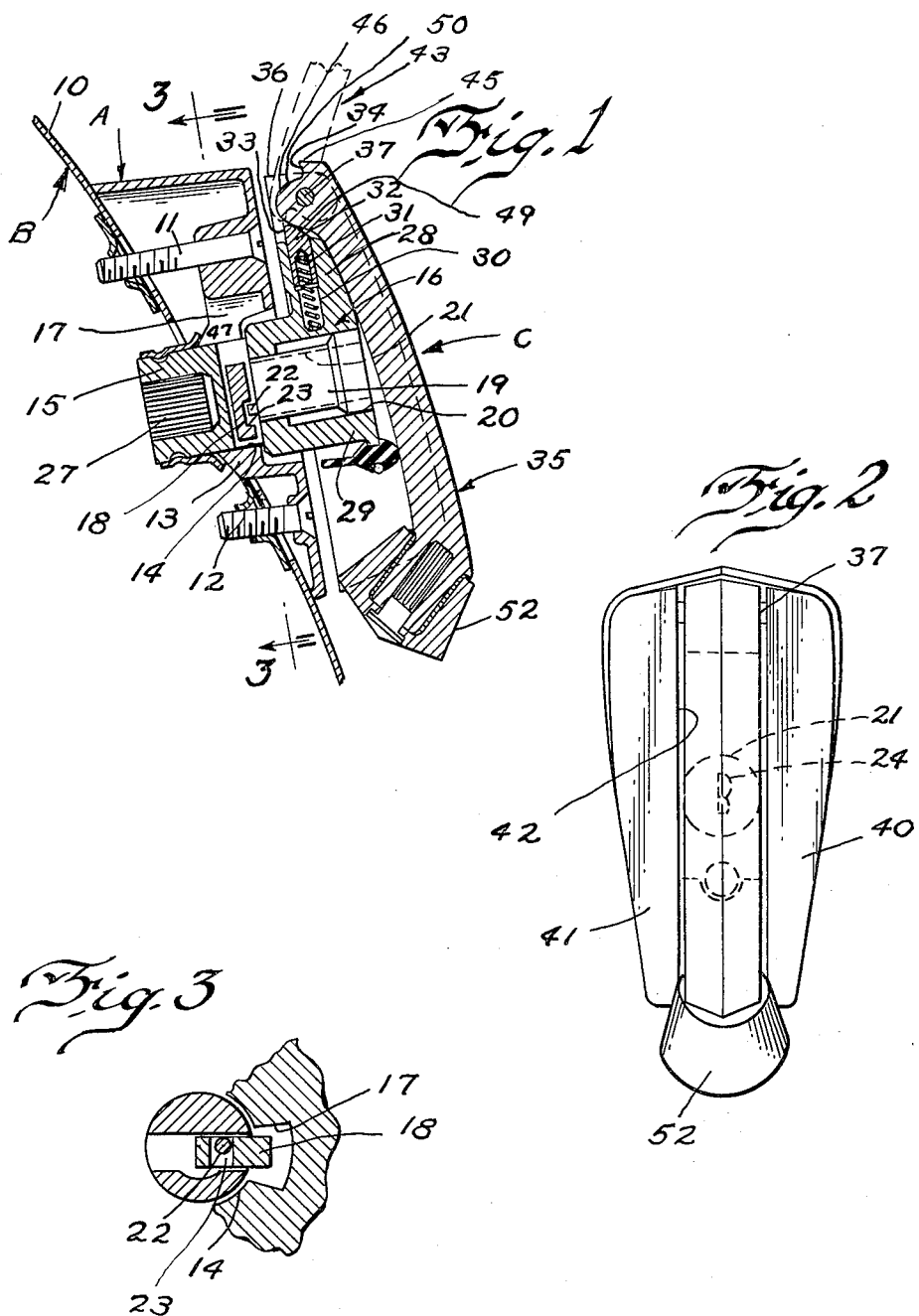
INVENTOR.
SAMUEL R. BARNES
BY Carl J. Barbee
ATTORNEY

United States Patent Office 3,007,348
Patented Nov. 7, 1961

3,007,348
COMBINATION TAILGATE WINDOW
CRANK AND LOCK
Samuel R. Barnes, Grosse Pointe Farms, Mich., assignor to American Motors Corporation, Kenosha, Wis., a corporation of Maryland
Filed Aug. 4, 1960, Ser. No. 47,459
3 Claims. (Cl. 74—547)

The invention relates to a combination window regulator crank and lock. As shown, the invention is utilized in conjunction with the tailgate of an automobile.

The invention has particular reference to a cranking handle of the folding type with cam means for retaining the handle in extended position during window raising or lowering operations.

A specific object is to provide cam means in conjunction with a spring pressed pin for limiting the swinging movement of the folding type handle in extended position.

Other objects and advantages of the invention will be apparent from the ensuing specification and appended drawing in which:

FIG. 1 is a sectional view of the combination lock and window crank assembly mounted on the tailgate of a vehicle, such tailgate being shown fragmentarily.

FIG. 2 is an end view of the lock and crank assembly.

FIG. 3 is a fragmentary sectional view through the cylinder lock and a portion of the keeper.

In general a keeper casting A is anchored to the tailgate panel B. A window crank assembly C is rotatably mounted relative to the keeper casting and functions for raising and lowering a window, not shown, which telescopes between the spaced front and rear panels of the tailgate assembly B (the front panel not being shown).

The keeper casting is secured to the rear panel 10 of the tailgate as by means of suitable screws 11 and 12. The casting has a central boss portion 13 with a bore 14 therethrough for rotatably receiving the shank 15 of the crank casting 16. The keeper casting has a notch 17 formed therein and opening into the bore 14 into which the latch bolt 18 enters, as shown in FIG. 3, for locking the crank against rotation as desired. A cylinder barrel 19 is mounted in the bore 20 of the crank casting and a suitable lock cylinder 21 of conventional type is rotatably mounted within the cylinder barrel. A cam 22 which is actuated by the lock cylinder projects into the notch 23 in the latch bolt and rotation of the lock cylinder by means of a key inserted in the key slot 24 reciprocates the latch bolt for locking the crank against rotation as desired.

The inner end of the crank casting 15 has an internally serrated bore 27 for receiving the stem of a window raising and lowering mechanism (not shown) of conventional construction. The purpose of locking the crank against rotation is, of course, to prevent entry into the interior of the vehicle when the window is fully closed.

The crank casting has a boss 28 projecting radially outwardly from central hub portion 29 and is provided with a bore 30 opening into counterbore 31. A latch pin 32 is reciprocably received in the counterbore 31 and has a nose portion 33 with a contour similar to the notch 34 which is formed at the inner end of the crank 35. The upper end of the crank casting is bifurcated at 36 to receive the upper or inner end of the crank 35. The crank is swingably mounted on a pin 37. The crank casting is formed with side wings 40 and 41 providing an elongated slot 42 into which the crank handle 35 nests when the handle is folded down into inactive position, as shown in FIGS. 1 and 2. When the handle is folded in down position, it serves as a cover for the cylinder lock 21.

With the latch bolt 18 in unlocked position, as shown in FIG. 1, the crank handle 35 can be raised to extended position, as shown in dotted lines at 43 in FIG. 1, for rotating the crank casting 16. In order to limit the upward travel of the crank handle when being swung to extended position, the upper end of the handle is provided with a lug 45 for engaging the pin 33. The upper end of the crank handle has a cam surface 46 formed thereon for causing retraction of the holding pin 33 against the tension of spring 47 until such time as the nose of the pin enters the notch 34. Then the pin 33 is urged partially outwardly under the influence of the spring for causing the inclined surface 49 to act against the crank surface 50 for holding the crank handle in extended position under the slight tension of the spring 47.

When it is desired to return the crank handle to folded down position, only a light manual pressure is necessary to overcome the resistance of the spring as the pin 33 is retracted under the influence of the cam surface 50. A suitable knob 52 is rotatably mounted on the end of the handle 35 in a conventional manner.

A single form of the invention is illustrated, but it is to be understood that the invention can take many different forms, and that various modifications and changes in the details are within the principles of the invention and the scope of the claims.

I claim:
1. A window regulator secured to the door panel of an automobile and comprising a keeper casting anchored to the door panel and having a boss portion with a bore therein; a crank casting including a hub portion rotatably supported in the bore of the boss portion of the keeper casting; said crank casting also including a bifurcated portion at one end thereof; a crank handle having a head portion received in the bifurcated portion of the crank casting and mounted for swinging movement relative thereto; said crank casting having an elongated recess in its front wall; said crank handle having an elongated body portion capable of nesting within the elongated recess in the front wall of the crank casting; said crank casting hub having a spring retaining bore opening into its bifurcated portion; a spring-pressed pin received in such bore and contacting the head portion of the crank handle for limiting swinging movement of the crank handle in a direction away from the recess of the crank casting.

2. A window regulator secured to the door panel of an automobile and comprising a keeper casting anchored to the door panel and having a boss portion with a bore therein; a crank casting including a hub portion rotatably supported in the bore of the boss portion of the keeper casting; said crank casting also including a bifurcated portion at one end thereof; a crank handle having a head portion received in the bifurcated portion of the crank casting and mounted for swinging movement relative thereto; said crank casting having an elongated recess in its front wall; said crank handle having an elongated body portion capable of nesting within the elongated recess in the front wall of the crank casting; said crank casting hub having a spring retaining bore extending transversely of the axis of the keeper boss bore and opening into its bifurcated portion; a spring-pressed pin received in such bore; said head portion of the crank handle having a cam surface engaged by the pin and a lug for engagement by the pin to limit swinging movement of the crank handle in a direction away from the recess of the crank casting.

3. In an automobile tailgate, a window regulator mounted on a panel of the tailgate, the regulator including a keeper casting and a crank casting, said keeper casting secured to said tailgate panel and having a central boss portion provided with a bore therethrough for rotatably receiving the shank of said crank casting, said crank casting provided with a hub portion having a boss projecting radially outwardly from said hub and having a bore opening into a counterbore, said bore and counterbore extending transversely with reference to the axis of the crank casting hub portion, the upper end of said crank casting being bifurcated and providing side wings separated by a slot, a crank swingably mounted on said crank casting between said wings and normally nesting in said slot, said crank having a notch formed at its inner end, a latch pin reciprocably received in said counterbore and having a nose portion with a contour similar to the contour of said notch, said upper end of said crank provided with a lug and a cam surface, a spring mounted in the bore of said boss and in said pin, said cam surface moving over said pin upon upward swinging movement of said crank and retracting said pin against the tension of said spring with said crank limited in its upward movement by engagement of said nose portion with said lug.

References Cited in the file of this patent

UNITED STATES PATENTS

| | | |
|---|---|---|
| 1,185,972 | Brown | June 6, 1916 |
| 1,274,471 | Todd | Aug. 6, 1918 |
| 2,346,615 | Santon | Apr. 11, 1944 |
| 2,727,406 | Opocensky | Dec. 20, 1955 |